US010622611B2

(12) United States Patent
Nishikawa et al.

(10) Patent No.: US 10,622,611 B2
(45) **Date of Patent: *Apr. 14, 2020**

(54) SEPARATOR FOR NONAQUEOUS ELECTROLYTE BATTERY, AND NONAQUEOUS ELECTROLYTE BATTERY

(71) Applicant: TEIJIN LIMITED, Osaka-shi, Osaka (JP)

(72) Inventors: Satoshi Nishikawa, Yamaguchi (JP); Takashi Yoshitomi, Yamaguchi (JP)

(73) Assignee: TEIJIN LIMITED, Osaka (JP)

( * ) Notice: Subject to any disclaimer, the term of this patent is extended or adjusted under 35 U.S.C. 154(b) by 199 days.

This patent is subject to a terminal disclaimer.

(21) Appl. No.: 15/866,590

(22) Filed: Jan. 10, 2018

(65) Prior Publication Data

US 2018/0130988 A1 May 10, 2018

Related U.S. Application Data

(63) Continuation of application No. 14/413,521, filed as application No. PCT/JP2013/070538 on Jul. 30, 2013, now Pat. No. 9,905,825.

(30) Foreign Application Priority Data

Jul. 30, 2012 (JP) ................................ 2012-168989

(51) Int. Cl.

| | |
|---|---|
| ***H01M 2/16*** | (2006.01) |
| ***H01M 10/0525*** | (2010.01) |
| ***H01M 2/14*** | (2006.01) |
| ***H01M 10/052*** | (2010.01) |
| ***B32B 27/20*** | (2006.01) |
| ***B32B 27/30*** | (2006.01) |
| ***B32B 27/32*** | (2006.01) |
| ***B32B 7/12*** | (2006.01) |

(52) U.S. Cl.

CPC ............ *H01M 2/1686* (2013.01); *B32B 7/12* (2013.01); *B32B 27/20* (2013.01); *B32B 27/304* (2013.01); *B32B 27/32* (2013.01); *H01M 2/1653* (2013.01); *H01M 10/0525* (2013.01); *B32B 2255/26* (2013.01); *B32B 2307/306* (2013.01); *B32B 2307/54* (2013.01); *B32B 2307/718* (2013.01); *B32B 2457/10* (2013.01); *H01M 2/145* (2013.01); *H01M 10/052* (2013.01); *H01M 2220/20* (2013.01); *H01M 2220/30* (2013.01)

(58) Field of Classification Search

CPC .......... B32B 2255/26; B32B 2307/306; B32B 2307/54; B32B 2307/718; B32B 2457/10; B32B 27/20; B32B 27/304; B32B 27/32; B32B 7/12; H01M 10/052; H01M 10/0525; H01M 2220/20; H01M 2220/30; H01M 2/14; H01M 2/145; H01M 2/1653; H01M 2/168; H01M 2/1686

See application file for complete search history.

(56) References Cited

U.S. PATENT DOCUMENTS

| | | | |
|---|---|---|---|
| 6,124,061 | A | 9/2000 | Hamano et al. |
| 2004/0053122 | A1 | 3/2004 | Sugiyama et al. |
| 2005/0277026 | A1 | 12/2005 | Nishikawa et al. |
| 2006/0088762 | A1 | 4/2006 | Okamoto |
| 2009/0079102 | A1 | 3/2009 | Takita et al. |
| 2010/0021822 | A1 | 1/2010 | Ikemoto et al. |
| 2010/0129720 | A1 | 5/2010 | Sako et al. |
| 2011/0059368 | A1 | 3/2011 | Inagaki et al. |
| 2011/0311878 | A1 | 12/2011 | Inagaki et al. |
| 2013/0130123 | A1 | 5/2013 | Kaneda et al. |

FOREIGN PATENT DOCUMENTS

| | | | |
|---|---|---|---|
| CN | 1953268 | A | 4/2007 |
| JP | 10-172606 | A | 6/1998 |
| JP | 2001-118558 | A | 4/2001 |
| JP | 2004-111160 | A | 4/2004 |
| JP | 2006-120462 | A | 5/2006 |
| JP | 4127989 | B2 | 7/2008 |
| JP | 2010-240936 | A | 10/2010 |
| JP | 2012-043762 | A | 3/2012 |
| JP | 2012-129116 | A | 7/2012 |

OTHER PUBLICATIONS

International Search Report for PCT/JP2013/070538 dated Sep. 3, 2013 (PCT/ISA/210).

*Primary Examiner* — Carlos Barcena

(74) *Attorney, Agent, or Firm* — Sughrue Mion, PLLC

(57) ABSTRACT

Provided is a separator for a nonaqueous electrolyte battery, including a porous substrate and an adhesive porous layer that is provided on one side or both sides of the porous substrate and contains an adhesive resin. The ratio of the standard deviation of the areal weight of the adhesive porous layer to the mean of the areal weight of the adhesive porous layer ($g/m^2$) (standard deviation/mean) is 0.3 or less.

13 Claims, No Drawings

SEPARATOR FOR NONAQUEOUS ELECTROLYTE BATTERY, AND NONAQUEOUS ELECTROLYTE BATTERY

CROSS REFERENCE TO RELATED APPLICATIONS

This application is a continuation of application Ser. No. 14/413,521 filed Jan. 8, 2015, which is a National Stage of International Application No. PCT/JP2013/070538 filed Jul. 30, 2013 (claiming priority based on Japanese Patent Application No. 2012-168989 filed Jul. 30, 2012), the contents of which are incorporated herein by reference in their entirety.

TECHNICAL FIELD

The present invention relates to a separator for a nonaqueous electrolyte battery and also to a nonaqueous electrolyte battery.

BACKGROUND ART

Nonaqueous secondary batteries, such as lithium ion secondary batteries, have been widely used as power sources for portable electronic devices such as laptop computers, mobile phones, digital cameras, and camcorders. Further, these batteries are characterized by having high energy density, and thus their application to automobiles and the like has also been studied in recent years.

With the reduction in size and weight of portable electronic devices, the outer casing of a nonaqueous secondary battery has been simplified. As outer casings, battery cans formed of aluminum cans have been developed to replace battery cans made of stainless steel originally used. Further, soft pack outer casings formed of aluminum laminate packs have been developed nowadays.

In the case of a soft pack outer casing formed from an aluminum laminate, because the outer casing is soft, a gap may be formed between an electrode and a separator upon charging and discharging. This causes the reduction of cycle life. The maintenance of uniform adhesion between bonded parts of an electrode, a separator, or the like, is one of the important technical issues.

As techniques associated with adhesion, various techniques have been proposed for enhancing adhesion between electrodes and a separator. As one of such techniques, a technique of using a separator including a polyolefin microporous membrane, which is a conventional separator, and a porous layer made of a polyvinylidene fluoride resin (hereinafter sometimes referred to as "adhesive porous layer") formed thereon has been proposed (see, e.g., Patent Document 1). When the separator is placed on an electrode and hot-pressed, the adhesive porous layer functions as an adhesive that joins the electrode and the separator well together. Therefore, the adhesive porous layer contributes to the improvement of the cycle life of a soft pack battery.

In relation to the separator including a polyolefin microporous membrane and an adhesive porous layer laminated thereon, for achieving both the ensuring of sufficient adhesion and ion permeability, a new technical proposal has been made focusing on the porous structure and thickness of the polyvinylidene fluoride resin layer.

PRIOR ART DOCUMENTS

Patent Documents

Patent Document 1: U.S. Pat. No. 4,127,989

SUMMARY OF THE INVENTION

Problems that the Invention is to Solve

However, in the case where an adhesive porous layer is to be formed on a porous substrate such as a polyolefin microporous membrane (hereinafter sometimes simply referred to as substrate) by coating, non-uniformity may result from coating. In other words, variations may occur in the coat weight. In addition, there usually are variations in the thickness of a substrate.

In particular, when variations occur in the coat weight of an adhesive porous layer, variations are likely to occur also in adhesion to electrodes. Such variations in adhesion are directly related to non-uniform ion permeability in a battery. Accordingly, in a separator, a part with desired adhesion and a part with reduced adhesion differ in ion permeability. When a separator has a part with excellent ion permeability and a part with poor permeability, the part with high ion permeability is prone to membrane degradation, causing a significant decrease in long-term cycle characteristics as the entire battery.

The present invention has been made against the above background. An object of the invention is to provide a separator for a nonaqueous electrolyte battery, which has excellent adhesion to electrodes and provides a battery with improved cycle characteristics, and also a nonaqueous electrolyte battery that stably develops excellent cycle characteristics. The invention addresses the achievement of the above object.

Means for Solving the Problems

Specific means for achieving the above object are as follows.

<1> A separator for a nonaqueous electrolyte battery, including a porous substrate and an adhesive porous layer that is provided on one side or both sides of the porous substrate and contains an adhesive resin, the ratio of the standard deviation of the areal weight of the adhesive porous layer to the mean of the areal weight of the adhesive porous layer (g/m$^2$) (standard deviation/mean) being 0.3 or less.

<2> The separator for a nonaqueous electrolyte battery according to <1>, wherein the ratio of the standard deviation of the thickness of the porous substrate to the mean of the thickness of the porous substrate (μm) (standard deviation/mean) is 0.02 or less.

<3> The separator for a nonaqueous electrolyte battery according to <1> or <2>, wherein the adhesive resin is a polyvinylidene fluoride resin.

<4> The separator for a nonaqueous electrolyte battery according to <3>, wherein the polyvinylidene fluoride resin has a weight average molecular weight of 600,000 or more and 3,000,000 or less.

<5> The separator for a nonaqueous electrolyte battery according to any one of <1> to <4>, wherein the porous substrate has an elongation of 50% or more and 200% or less in the MD direction or the TD direction.

<6> The separator for a nonaqueous electrolyte battery according to any one of <1> to <5>, wherein the porous substrate has a puncture resistance of 200 g or more and 800 g or less.

<7> The separator for a nonaqueous electrolyte battery according to any one of <1> to <6>, wherein the adhesive porous layer contains a filler, and the mass ratio of the filler to the adhesive resin (filler mass/adhesive resin mass) is 0.01 or more and 0.05 or less.

<8> A nonaqueous electrolyte battery including a positive electrode, a negative electrode, and the separator for a nonaqueous electrolyte battery of any one of <1> to <7> disposed between the positive electrode and the negative electrode, an electromotive force thereof being obtained by lithium doping/dedoping.

Advantage of the Invention

The invention provides a separator for a nonaqueous electrolyte battery, which has excellent adhesion to electrodes and provides a battery with improved cycle characteristics. The invention also provides a nonaqueous electrolyte battery that stably develops excellent cycle characteristics.

MODE FOR CARRYING OUT THE INVENTION

Hereinafter, the separator for a nonaqueous electrolyte battery of the invention and a nonaqueous electrolyte battery using the same will be described in detail. Incidentally, a numerical range indicated by "to" below means a numerical range including the minimum and the maximum. With respect to the separator for a nonaqueous electrolyte battery of the invention, the "MD direction" refers to so-called "machine direction" and means the longitudinal direction of the separator that is produced in an elongated form. The "TD direction" refers to so-called "width direction" and means the direction that is perpendicular to the longitudinal direction of the separator that is produced in an elongated form.

<Separator for Nonaqueous Electrolyte Battery>

The separator for a nonaqueous electrolyte battery of the invention includes a porous substrate and an adhesive porous layer. The adhesive porous layer is provided on one side or both sides of the porous substrate and contains an adhesive resin. The ratio of the standard deviation of the areal weight of the adhesive porous layer to the mean of the areal weight of the adhesive porous layer [g/m$^2$] (standard deviation/mean) is 0.3 or less.

With respect to the areal weight of the adhesive porous layer, in the case where the adhesive porous layer is made only of an adhesive resin, it can be regarded as the areal weight of the adhesive resin in the adhesive porous layer. In the case where the adhesive porous layer contains an adhesive resin and other materials such as a filler, it can be regarded as the mass of solids forming the adhesive porous layer.

Incidentally, with respect to the areal weight (g/m$^2$) of the adhesive porous layer or the adhesive resin, in the case where the adhesive porous layer is provided by coating, it refers to the coat weight after drying (g/m$^2$).

In a separator having an adhesive porous layer on a porous substrate, ions are conducted mainly through pores in the separator. Therefore, when there are variations in the thickness of the adhesive porous layer, variations occur in the path length (distance) of ion-conducting pores, and ion permeability cannot be maintained uniform over the entire separator. When a separator has a region with high ion permeability and a region with poor permeability in this way, the region with high ion permeability is prone to membrane degradation. As a result, the cycle characteristics of the entire battery may be adversely affected. Variations in the areal weight of the adhesive porous layer are one of the factors that determine the level of ion permeability. Therefore, in the invention, variations in the areal weight of the adhesive porous layer [=(standard deviation of areal weight)/(mean of areal weight)] are suppressed within a predetermined range. As a result, the adhesion of the adhesive porous layer, especially adhesion to electrodes, is improved, and, when a battery is formed, the long-term cycle characteristics are dramatically improved. In addition, because variations in the areal weight of the adhesive porous layer are adjusted within the range of the invention, when the separator is slit to a desired size, defects caused by slitting can be reduced. As a result, the production yield can be improved.

When the value represented by "(standard deviation of areal weight)/(mean of areal weight)" of the adhesive porous layer is greater than 0.3, the areal weight greatly varies in the layer plane direction, leading to non-uniform in-plane ion permeability. This results in a significant decrease in cycle characteristics when a battery is formed. In addition, defects are likely to occur, such as loss of adhesive porous layer when the separator is slit.

In the invention, the ratio represented by "(standard deviation of areal weight)/(mean of areal weight)" of the adhesive porous layer is more preferably 0.2 or less, still more preferably 0.1 or less, and ideally zero (no variations).

The ratio represented by "(standard deviation of areal weight)/(mean of areal weight)" of the adhesive porous layer (variations in areal weight) is calculated using the mean and standard deviation obtained from the areal weight (g/m$^2$) of the adhesive porous layer determined as follows.

The areal weight of an adhesive porous layer is measured as follows. That is, ten sample pieces having a size of 10 cm×10 cm cut out from a separator are prepared, and the areal weight of each sample piece is measured. Next, the adhesive porous layer (coating layer) provided on each sample piece is dissolved away by a solvent, and the areal weight of each porous substrate is measured. Subsequently, the areal weight of the porous substrate is subtracted from the areal weight of the separator to determine the areal weight of the adhesive porous layer of each sample piece.

Here, in the invention, the "standard deviation" and the "mean" mean an ordinary standard deviation and an ordinary mean, respectively, and are defined as follows.

That is, in a population made of N data, $x_1$, $x_2$, . . . , and $x_N$, a "mean" is defined as the arithmetic average of the population (population mean m) as shown by the following equation. That is, in the invention, the mean of the areal weight of the adhesive porous layer is determined by summing areal weight values measured at 10 points of a separator and dividing the sum by 10.

$$m = \frac{1}{N}\sum_{i=1}^{N} x_i \quad \text{[Equation 1]}$$

Next, using the population mean m, an unbiased variance $\sigma^2$ is defined as in the following equation.

$$\sigma^2 = \frac{1}{N-1}\sum_{i=1}^{N} (x_i - m)^2 \quad \text{[Equation 2]}$$

The positive square root $\sigma$ of the unbiased variance $\sigma^2$ is defined as the "standard deviation." That is, in the invention, the standard deviation of the areal weight of the adhesive porous layer is obtained by applying a mean value of areal weights measured at 10 points of a separator to the above equation to determine the unbiased variance $\sigma^2$, and calculating the square root thereof.

In the invention, the method for adjusting the ratio of the standard deviation to mean of the areal weight of an adhesive porous layer to be within a range of 0.3 or less may be a method that selects the physical properties of a porous substrate, such as variations in the thickness of the porous substrate, or selects a porous substrate having suitable physical properties such as elongation, puncture resistance, tensile strength, and Young's modulus. Alternatively, in the case where a filler is contained in the adhesive porous layer, it may also be a method that adjusts the filler content, for example. The adjustment of the physical properties of a porous substrate improves the coating stability in the formation of an adhesive porous layer by a coating method, for example, resulting in a uniform coat weight, whereby a highly uniform coating film is obtained.

With respect to the thickness of the porous substrate, in terms of improving adhesion to electrodes as a separator, it is preferable that variations in the thickness of the porous substrate in the plane direction are suppressed to a certain value or lower. The suppression of variations in the thickness reduces variations in ion permeation in the separator. Specifically, it is preferable that the ratio of "the standard deviation of the thickness of the porous substrate" to "the mean of the thickness [μm]" of the porous substrate (=" (standard deviation of thickness)/(mean of thickness)") is adjusted to 0.02 or less.

The ratio of the standard deviation of the thickness of the porous substrate to the mean of the thickness of the porous substrate (variations in thickness) is calculated using the mean and standard deviation obtained from the thickness (μm) of the porous substrate determined as follows.

The thickness of a porous substrate is measured as follows. That is, the porous substrate is cut to a size of 10 cm×10 cm, and ten sample pieces are prepared. The center of each sample piece in the width direction (TD) is measured for thickness at 10 points at intervals of 1 cm in the length direction (MD) to give thickness data at 100 points in total. Then, based on the thickness data at 100 points, the mean and standard deviation are calculated in the same manner as in the case of the areal weight mentioned above. For the measurement of thickness, a contact thickness meter (e.g., LITEMATIC manufactured by Mitutoyo Corporation) is used. A cylindrical terminal 5 mm in diameter is used as a measuring terminal, and it is adjusted to apply a load of 7 g during the measurement.

When the value represented by "(standard deviation of thickness)/(mean of thickness)" in the porous substrate is 0.02 or less, plane-direction thickness variations in a layer provided on the substrate can be made small, whereby the path length (distance) of ion-conducting pores becomes even more uniform. This results in uniform in-plane ion permeability, and cycle characteristics as a battery can be stably maintained for a long period of time.

The ratio represented by "(standard deviation of thickness)/(mean of thickness)" is more preferably 0.01 or less, still more preferably 0.005 or less, and ideally zero (no variations).

The technique for controlling variations in the thickness of the porous substrate is not particularly limited. For example, it is possible to select a commercially available porous substrate that satisfies the thickness conditions mentioned above.

[Porous Substrate]

The porous substrate in the invention means a substrate having pores or voids inside. Examples of such substrates include microporous membranes, porous sheets made of a fibrous material, such as nonwoven fabrics and paper-like sheets, and composite porous sheets including such a microporous membrane or porous sheet as well as one or more other porous layers laminated thereon.

A microporous membrane means a membrane having a large number of micropores inside and configured such that the micropores are connected to allow gas or liquid to pass from one side to the other side.

The material forming the porous substrate may be an organic material or an inorganic material as long as it is an electrically insulating material. In terms of imparting a shutdown function to the porous substrate, it is preferable that the material forming the porous substrate is a thermoplastic resin.

A shutdown function refers to the following function: upon an increase in battery temperature, a constituent material melts and closes pores of the porous substrate, thereby blocking the movement of ions to prevent the battery from thermal runaway.

As the thermoplastic resin, a thermoplastic resin having a melting point of less than 200° C. is suitable, and polyolefins are particularly preferable.

As a porous substrate using a polyolefin, a polyolefin microporous membrane is preferable.

As the polyolefin microporous membrane, among polyolefin microporous membranes that have been applied to conventional separators for a nonaqueous electrolyte battery, one having sufficient dynamic properties and ion permeability can be preferably used.

In terms of developing a shutdown function, it is preferable that the polyolefin microporous membrane contains polyethylene, and it is preferable that the polyethylene content is 95 mass % or more.

In addition to the above, in terms of imparting heat resistance that prevents the membrane from easily breaking when exposed to high temperatures, a polyolefin microporous membrane containing polyethylene and polypropylene is preferable. An example of such a polyolefin microporous membrane is a microporous membrane in which both polyethylene and polypropylene are present in one layer. In terms of achieving both a shutdown function and heat resistance, it is preferable that the microporous membrane contains 95 mass % or more polyethylene and 5 mass % or less polypropylene. In addition, in terms of achieving both a shutdown function and heat resistance, it is also preferable that the polyolefin microporous membrane has a laminated structure including two or more layers, in which at least one layer contains polyethylene, while at least one layer contains polypropylene.

It is preferable that the polyolefin contained in the polyolefin microporous membrane has a weight average molecular weight of 100,000 to 5,000,000. When the weight average molecular weight is 100,000 or more, sufficient dynamic properties can be ensured. Meanwhile, a weight average molecular weight of 5,000,000 or less leads to excellent shutdown characteristics and also facilitates membrane formation.

A polyolefin microporous membrane can be produced by the following methods, for example. That is, a method including (i) extruding a molten polyolefin resin from a T-die to form a sheet, (ii) subjecting the sheet to a crystallization treatment, (iii) stretching the same, and further (iv) heat-treating the stretched sheet to form a microporous membrane can be mentioned. As an alternative method, a method including (i) melting a polyolefin resin together with a plasticizer such as liquid paraffin and extruding the melt from a T-die, followed by cooling to form a sheet, (ii) stretching the sheet, (iii) extracting the plasticizer from the stretched sheet, and further (iii) heat-treating the sheet to form a microporous membrane can also be mentioned, for example.

Examples of porous sheets made of a fibrous material include porous sheets made of fibrous materials, for example, polyesters such as polyethylene terephthalate; polyolefins such as polyethylene and polypropylene; and heat-resistant polymers such as aromatic polyamide, polyimide, polyethersulfone, polysulfone, polyether ketone, and polyetherimide. Examples also include porous sheets made of a mixture of these fibrous materials.

A composite porous sheet may be configured to include a microporous membrane or a porous sheet made of a fibrous material as well as a functional layer laminated thereon. The composite porous sheet is preferable in that further functions can be imparted by the functional layer. In terms of imparting heat resistance, for example, the functional layer may be a porous layer made of a heat-resistant resin or a porous layer made of a heat-resistant resin and an inorganic filler. The heat-resistant resin may be one or more kinds of heat-resistant polymers selected from aromatic polyamide, polyimide, polyethersulfone, polysulfone, polyether ketone, and polyetherimide. As the inorganic filler, metal oxides such as alumina, metal hydroxides such as magnesium hydroxide, and the like can be preferably used.

Incidentally, examples of compositing techniques include a method in which a microporous membrane or a porous sheet is coated with a functional layer, a method in which a microporous membrane or a porous sheet and a functional layer are joined together using an adhesive, and a method in which a microporous membrane or a porous sheet and a functional layer are bonded together by thermocompression.

As mentioned above, in terms of adjusting the ratio of the standard deviation of the areal weight of the adhesive resin to the mean of the areal weight of the adhesive resin to be within a range of 0.3 or less, it is preferable that the elongation, puncture resistance, tensile strength, and Young's modulus of the porous substrate are adjusted to be within the following ranges, for example.

It is preferable that the porous substrate has an elongation of 50% or more and 200% or less in the MD direction or the ID direction. The lower limit is more preferably 80% or more, and still more preferably 100% or more. The upper limit is preferably 180% or less, and more preferably 150% or less.

It is preferable that the porous substrate has a puncture resistance of 200 g or more and 800 g or less. The lower limit is more preferably 250 g or more, and still more preferably 300 g or more. The upper limit is preferably 700 g or less, and preferably 600 g or less.

It is preferable that the porous substrate has a tensile strength of 1 N/cm or more and 25 N/cm or less in the MD direction or the TD direction. The lower limit is more preferably 3 N/cm or more, and still more preferably 5 N/cm or more. The upper limit is preferably 22 N/cm or less, and preferably 20 N/cm or less.

It is preferable that the porous substrate has a Young's modulus of 800 MPa or more and 5,000 MPa or less. The lower limit is more preferably 900 MPa or more, and still more preferably 1,000 MPa or more. The upper limit is preferably 4,000 MPa or less, and preferably 3,000 MPa or less.

A Young's modulus is the amount of elastic deformation in response to the application of force within a range where elasticity is shown, that is, the stress required per unit strain, and is equivalent to, for example, the slope of the linear portion of a stress-strain curve obtained by plotting stress on the ordinate against strain on the abscissa. A Young's modulus is determined by the following equation from the relation of the amount of strain to the direction of stress under unidirectional tension or compression.

$$E=\sigma/\varepsilon \ [E\text{: Young's modulus, } \sigma\text{: strain, } \varepsilon\text{: stress}]$$

In terms of obtaining excellent dynamic properties and internal resistance, it is preferable that the porous substrate has a thickness (mean) within a range of 5 μm to 25 μm.

In terms of preventing short circuits in a battery and obtaining sufficient ion permeability, it is preferable that the porous substrate has a Gurley number (JIS P8117) within a range of not less than 50 sec/100 cc and not more than 800 sec/100 cc.

[Adhesive Porous Layer]

The adhesive porous layer in the invention is a layer having a porous structure in which a large number of micropores are present inside, and the micropores are connected to each other to allow gas or liquid to pass from one side to the other side. The porous structure of the adhesive porous layer is an important technical factor.

The adhesive porous layer is provided as the outermost layer(s) of the separator on one side or both sides of the porous substrate. The adhesive porous layer allows for bonding to an electrode. That is, when the separator and an electrode are stacked and hot-pressed, the adhesive porous layer can bond the separator to the electrode. In the case where the separator for a nonaqueous electrolyte battery of the invention has the adhesive porous layer only on one side of the porous substrate, the adhesive porous layer adheres to the positive electrode or the negative electrode. In addition, in the case where the separator for a nonaqueous electrolyte battery of the invention has the adhesive porous layer on both sides of the porous substrate, the adhesive porous layer adheres to both the positive electrode and the negative electrode. In terms of providing a battery with excellent cycle characteristics, it is preferable that the adhesive porous layer is provided on both sides of the porous substrate rather than only one side. This is because when the adhesive porous layer is present on both sides of the porous substrate, both sides of the separator adhere well to both electrodes via the adhesive porous layer.

In the invention, in the case where the adhesive porous layer is applied to and formed on both sides of the porous substrate, the coat weight of the adhesive porous layer (mean of areal weight) on one side of the porous substrate is preferably 0.5 $g/m^2$ to 1.5 $g/m^2$, and more preferably 0.7 $g/m^2$ to 1.3 $g/m^2$. When the coat weight is 0.5 $g/m^2$ or more, this leads to excellent adhesion to electrodes, providing a battery with excellent cycle characteristics. Meanwhile, when the coat weight is 1.5 $g/m^2$ or less, this makes it easy to suppress variations in the coat weight of the adhesive porous layer within the above range, whereby excellent ion permeability is ensured, providing a battery with good load characteristics.

In the case where the adhesive porous layer is provided on both sides of the porous substrate, the difference between the coat weight on one side and the coat weight on the other side is preferably 20% or less of the total coat weight on both sides. When the difference is 20% or less, the separator is resistant to curling. This results in good handleability, and also the problem of decreased cycle characteristics is unlikely to occur.

It is preferable that the thickness of the adhesive porous layer on one side of the porous substrate is 0.3 μm to 5 μm. When the thickness is 0.3 μm or more, this makes it easy to suppress variations in the coat weight of the adhesive porous layer within the above range, and leads to even better adhesion to electrodes, providing a battery with excellent cycle characteristics. When the thickness is 5 μm or less, even better ion permeability is ensured, providing a battery with excellent load characteristics. For the same reason as above, the thickness of the adhesive porous layer on one side of the porous substrate is more preferably 0.5 μm to 5 μm, and still more preferably 1 μm to 2 μm.

In the invention, in terms of ion permeability, it is preferable that the structure of the adhesive porous layer is sufficiently porous. Specifically, it is preferable that the porosity is 30% to 60%. When the porosity is 30% or more, ion permeability is excellent, leading to even better battery characteristics. In addition, a porosity of 60% or less provides dynamic properties sufficient to prevent the porous structure from being destroyed upon bonding to an electrode by hot pressing. In addition, a porosity of 60% or less provides low surface porosity, leading to an increase in the area occupied by the adhesive resin (preferably polyvinylidene fluoride resin), whereby even better adhesion strength can be ensured. Incidentally, it is more preferable that the porosity of the adhesive porous layer is within a range of 30 to 50%.

It is preferable that the adhesive porous layer has an average pore size of 1 nm to 100 nm. When the average pore size of the adhesive porous layer is 100 nm or less, a porous structure in which uniform pores are uniformly dispersed is likely to be obtained, whereby points of bonding to an electrode can be uniformly dispersed, resulting in excellent adhesion. This also results in uniform ion migration. Thus, even better cycle characteristics can be obtained, and also further excellent load characteristics can be obtained. Meanwhile, although it is preferable, in terms of uniformity, that the average pore size is as small as possible, it is practically difficult to form a porous structure of less than 1 nm. In addition, in the case where the adhesive porous layer is impregnated with an electrolyte, the resin (e.g., polyvinylidene fluoride resin) may swell, and, when the average pore size is too small, the pores may be closed due to swelling, resulting in loss of ion permeability. Also from such a point of view, it is preferable that the average pore size is 1 nm or more.

The average pore size of the adhesive porous layer is more preferably 20 nm to 100 nm.

In terms of cycle characteristics, it is preferable that the polyvinylidene fluoride resin in the adhesive porous layer has a fibril diameter within a range of 10 nm to 1,000 nm.

The adhesive porous layer in the invention contains at least an adhesive resin and preferably contains a filler. In addition, the adhesive porous layer may be formed further using other components as necessary.

(Adhesive Resin)

The adhesive resin contained in the adhesive porous layer is not particularly limited as long as it can adhere to electrodes. Preferred examples thereof include polyvinylidene fluoride, polyvinylidene fluoride copolymers, styrene-butadiene copolymers, homopolymers and copolymers of vinyl nitriles such as acrylonitrile and methacrylonitrile, and polyethers such as polyethylene oxide and polypropylene oxide.

The adhesive porous layer may contain only one kind of adhesive resin, or may also contain two or more kinds.

In terms of adhesion to electrodes, it is particularly preferable that the adhesive resin is a polyvinylidene fluoride resin.

Examples of polyvinylidene fluoride resins include a homopolymer of vinylidene fluoride (i.e., polyvinylidene fluoride); copolymers of vinylidene fluoride and another copolymerizable monomer (polyvinylidene fluoride copolymers); and mixtures thereof.

Examples of monomers copolymerizable with vinylidene fluoride include tetrafluoroethylene, hexafluoropropylene (HFP), trifluoroethylene, trichloroethylene, and vinyl fluoride. They can be used alone, or it is also possible to use two or more kinds.

A polyvinylidene fluoride resin is obtained by emulsion polymerization or suspension polymerization.

Among polyvinylidene fluoride resins, in terms of adhesion to electrodes, copolymers copolymerized with at least vinylidene fluoride and hexafluoropropylene are preferable. Further, copolymers having a structural unit derived from vinylidene fluoride and a structural unit derived from hexafluoropropylene in an amount of 0.1 mol % or more and 5 mol % or less (preferably 0.5 mol % or more and 2 mol % or less) by mass are more preferable.

It is preferable that the polyvinylidene fluoride resin has a structural unit containing 98 mol % or more vinylidene fluoride. In the case where 98 mol % or more of vinylidene fluoride is present, dynamic properties and heat resistance sufficient for severe hot-pressing conditions can be ensured.

It is preferable that the adhesive resin (especially polyvinylidene fluoride resin) has a weight average molecular weight (Mw) within a range of 600,000 to 3,000,000. When the weight average molecular weight is 600,000 or more, dynamic properties that can withstand the treatment for bonding to electrodes can be ensured for the adhesive porous layer, and sufficient adhesion can be obtained. Meanwhile, when the weight average molecular weight is 3,000,000 or less, viscosity at the time of formation of the layer does not become too high, leading to good formability and crystal formation, resulting in excellent porousness. The lower limit of the weight average molecular weight is more preferably 700,000 or more, and still more preferably 800,000 or more. The upper limit of the weight average molecular weight is preferably 2,000,000 or less, and preferably 1,500,000 or less.

Incidentally, the weight average molecular weight (Dalton) of the adhesive resin is a polystyrene-equivalent molecular weight measured by gel permeation chromatography (hereinafter sometimes referred to as GPC) under the following conditions.

<Conditions>

GPC: Alliance GPC 2000 [manufactured by Waters Corporation]

Column: TSKgel $GMH_6$-HTx2+TSKgel $GMH_6$-HTLx2 [manufactured by Tosoh Corporation]

Mobile phase solvent: o-Dichlorobenzene

Reference sample: Monodisperse polystyrene [manufactured by Tosoh Corporation]

Column temperature: 140° C.

When the adhesive porous layer is impregnated with an electrolyte, the degree of swelling of the resin contained in the adhesive porous layer depends on the kind of resin or the electrolyte composition. In order to suppress defects caused by the swelling of the resin, it is preferable to select a polyvinylidene fluoride resin that is resistant to swelling. For example, a polyvinylidene fluoride resin containing a large amount of copolymer component is prone to swelling, while a polyvinylidene fluoride resin containing 98 mol % or more vinylidene fluoride is resistant to swelling and thus preferable.

In addition, a polyvinylidene fluoride resin is prone to swelling with an electrolyte having a high content of cyclic carbonate, such as ethylene carbonate or propylene carbonate, and a high dielectric constant. However, a polyvinylidene fluoride resin containing 98 mol % or more vinylidene fluoride is relatively resistant to swelling and thus preferable.

(Filler)

The adhesive porous layer may contain a filler made of an inorganic substance or an organic substance. When the adhesive porous layer contains a filler, the slidability and heat resistance of the separator are improved.

Examples of inorganic fillers include metal oxides such as alumina and metal hydroxides such as magnesium hydroxide. In addition, examples of organic fillers include acrylic resins.

It is preferable that the mass ratio of the filler to the adhesive resin (filler mass/adhesive resin mass) is 0.01 or more and 0.05 or less. The adjustment of the filler content in this way makes it easy to adjust the value represented by "(standard deviation of areal weight)/(mean of areal weight)" of the adhesive porous layer to be within the range of the invention.

[Characteristics of Separator]

In terms of mechanical strength and of energy density as a battery, it is preferable that the separator for a nonaqueous electrolyte battery of the invention has an entire thickness of 5 μm to 35 μm.

In terms of mechanical strength, handleability, and ion permeability, it is preferable that the separator for a nonaqueous electrolyte battery of the invention has a porosity of 30% to 60%.

In terms of achieving a good balance between mechanical strength and membrane resistance, it is preferable that the separator for a nonaqueous electrolyte battery of the invention has a Gurley number (JIS P8117) of 50 sec/100 cc to 800 sec/100 cc.

In terms of ion permeability, in the separator for a nonaqueous electrolyte battery of the invention, it is preferable that the difference between the Gurley number of the porous substrate and the Gurley number of the separator including the porous substrate and an adhesive porous layer provided thereon is not more than 300 sec/100 cc, more preferably not more than 150 sec/100 cc, and still more preferably not more than 100 sec/100 cc.

In terms of the load characteristics of a battery, it is preferable that the separator for a nonaqueous electrolyte battery of the invention has a membrane resistance of 1 ohm-cm$^2$ to 10 ohm-cm$^2$. Membrane resistance herein refers to the resistance of the separator as impregnated with an electrolyte, and is measured by an alternating-current method. The resistance naturally depends on the kind of electrolyte and the temperature, and the above value is a value measured at 20° C. using 1 M $LiBF_4$-propylene carbonate/ethylene carbonate (mass ratio: 1/1) as the electrolyte.

In terms of ion permeability, it is preferable that the separator for a nonaqueous electrolyte battery of the invention has a tortuosity of 1.5 to 2.5.

<Method for Producing Separator>

The separator for a nonaqueous electrolyte battery of the invention can be produced, for example, by a method in which a porous substrate is coated thereon with a coating liquid containing an adhesive resin, such as a polyvinylidene fluoride resin, to form a coating layer, and then the resin of the coating layer is solidified, thereby integrally forming an adhesive porous layer on the porous substrate.

The following describes the case where the adhesive porous layer is formed using a polyvinylidene fluoride resin.

An adhesive porous layer using a polyvinylidene fluoride resin as an adhesive resin can be preferably formed by the following wet coating method, for example.

The wet coating method is a film formation method including (i) a step of dissolving a polyvinylidene fluoride resin in a suitable solvent to prepare a coating liquid, (ii) a step of coating a porous substrate with the coating liquid, (iii) a step of immersing the porous substrate in a suitable coagulation liquid to induce phase separation and solidify the polyvinylidene fluoride resin, (iv) a step of washing with water, and (v) a step of drying, thereby forming a porous layer on the porous substrate. The detail of the wet coating method suitable for the invention is as follows.

As a solvent that dissolves a polyvinylidene fluoride resin (hereinafter sometimes referred to as "good solvent") used for the preparation of a coating liquid, it is preferable to use a polar amide solvent such as N-methylpyrrolidone, dimethylacetamide, or dimethylformamide.

In terms of forming an excellent porous structure, in addition to the good solvent, it is preferable to mix a phase separation agent that induces phase separation. Examples of phase separation agents include water, methanol, ethanol, propyl alcohol, butyl alcohol, butanediol, ethylene glycol, propylene glycol, and tripropylene glycol. It is preferable that the phase separation agent is added within a range where viscosity suitable for coating can be ensured.

In terms of forming an excellent porous structure, it is preferable that the solvent is a mixed solvent containing 60 mass % or more a good solvent and 40 mass % or less a phase separation agent.

In terms of forming an excellent porous structure, it is preferable that the coating liquid contains the polyvinylidene fluoride resin at a concentration of 3 to 10 mass %.

In the case where a filler or other components are added to the adhesive porous layer, they may be mixed with or dissolved in the coating liquid.

In general, a coagulation liquid contains the good solvent and phase separation agent used for the preparation of a coating liquid and water. In terms of production, it is preferable that the mixing ratio between the good solvent and the phase separation agent is determined according to the mixing ratio in the mixed solvent used for dissolving a polyvinylidene fluoride resin. In terms of the formation of a porous structure and productivity, it is suitable that the concentration of water is 40 mass % to 90 mass %.

The coating of a porous substrate with the coating liquid may be performed using a conventional coating technique, such as a Mayer bar, a die coater, a reverse roll coater, or a gravure coater. In the case where an adhesive porous layer is formed on both sides of the porous substrate, in terms of productivity, it is preferable that both sides of the substrate are simultaneously coated with the coating liquid.

In addition to the wet coating method mentioned above, the adhesive porous layer can be produced by a dry coating method. Here, the dry coating method is a method in which, for example, a porous substrate is coated with a coating liquid containing a polyvinylidene fluoride resin and a solvent, and then the resulting coating layer is dried to volatilize the solvent away, thereby giving a porous layer. However, as compared with the wet coating method, the dry coating method tends to give a dense coating layer. Accordingly, the wet coating method is more preferable in terms of obtaining an excellent porous structure.

The separator for a nonaqueous electrolyte battery of the invention can also be produced by a method in which an adhesive porous layer is formed as an independent sheet, then the adhesive porous layer is placed on a porous substrate, and they are composited by thermocompression bonding or using an adhesive. The method for producing an adhesive porous layer as an independent sheet may be a method in which a release sheet is coated thereon with a coating liquid containing a resin, then an adhesive porous layer is formed by the wet coating method or dry coating method mentioned above, and the adhesive porous layer is peeled off from the release sheet.

<Nonaqueous Electrolyte Battery>

The nonaqueous electrolyte battery of the invention is a nonaqueous electrolyte battery whose electromotive force is obtained by lithium doping/dedoping, and is configured to include a positive electrode, a negative electrode, and the separator for a nonaqueous electrolyte battery of the invention mentioned above. Incidentally, doping means occlusion, support, adsorption, or intercalation, and refers to the phenomenon that lithium ions enter the active material of an electrode such as a positive electrode.

The nonaqueous electrolyte battery is configured such that a battery element, which includes an electrolyte-impregnated structure having the negative electrode and the positive electrode facing each other via the separator, is enclosed in an outer casing material. The nonaqueous electrolyte battery of the invention is suitable for a nonaqueous electrolyte secondary battery, particularly a lithium ion secondary battery.

The nonaqueous electrolyte battery of the invention includes, as a separator, the separator for a nonaqueous electrolyte battery of the invention mentioned above, and thus is excellent in terms of adhesion between the electrodes and the separator. At the same time, the yield of the production process is high, and electrolyte retention is also excellent. Accordingly, the nonaqueous electrolyte battery of the invention develops stable cycle characteristics.

The positive electrode may be configured such that an active material layer containing a positive electrode active material and a binder resin is formed on a collector. The active material layer may further contain an electrically conductive auxiliary.

Examples of positive electrode active materials include lithium-containing transition metal oxides. Specific examples thereof include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, and $LiAl_{1/4}Ni_{3/4}O_2$.

Examples of binder resins include polyvinylidene fluoride resins and styrene-butadiene copolymers.

Examples of electrically conductive auxiliaries include carbon materials such as acetylene black, ketjen black, and graphite powder.

Examples of collectors include aluminum foils, titanium foils, and stainless steel foils having a thickness of 5 μm to 20 μm.

In the nonaqueous electrolyte battery of the invention, in the case where the separator includes an adhesive porous layer containing a polyvinylidene fluoride resin, and the adhesive porous layer is disposed on the positive electrode side, because the polyvinylidene fluoride resin has excellent oxidation resistance, a positive electrode active material that can be operated at a high voltage of 4.2 V or more, such as $LiMn_{1/2}Ni_{1/2}O_2$ or $LiCo_{1/3}Mn_{1/3}Ni_{1/3}O_2$, can be easily applied; thus, this is advantageous.

The negative electrode may be configured such that an active material layer containing a negative electrode active material and a binder resin is formed on a collector. The active material layer may further contain an electrically conductive auxiliary.

Examples of negative electrode active materials include materials capable of electrochemically occluding lithium. Specific examples thereof include carbon materials, silicon, tin, aluminum, and Wood's alloy.

Examples of binder resins include polyvinylidene fluoride resins and styrene-butadiene copolymers.

Examples of electrically conductive auxiliaries include carbon materials such as acetylene black, ketjen black, and graphite powder.

Examples of collectors include copper foils, nickel foils, and stainless steel foils having a thickness of 5 μm to 20 μm.

In addition, instead of such a negative electrode, a metal lithium foil may also be used as the negative electrode.

The electrolyte is a solution obtained by dissolving a lithium salt in a nonaqueous solvent.

Examples of lithium salts include $LiPF_6$, $LiBF_4$, and $LiClO_4$.

Examples of nonaqueous solvents include cyclic carbonates such as ethylene carbonate, propylene carbonate, fluoroethylene carbonate, and difluoroethylene carbonate; linear carbonates such as dimethyl carbonate, diethyl carbonate, ethyl methyl carbonate, and fluorine substitutions thereof; and cyclic esters such as γ-butyrolactone and γ-valerolactone. They may be used alone or as a mixture.

As the electrolyte, one obtained by mixing a cyclic carbonate and a linear carbonate in a mass ratio (cyclic carbonate/linear carbonate) of 20/80 to 40/60 and dissolving a lithium salt therein at 0.5 M to 1.5 M is preferable.

Examples of outer casing materials include metal cans and packs formed from an aluminum laminate film.

The shape of batteries may be prismatic, cylindrical, coin-type, etc., and the separator for a nonaqueous electrolyte battery of the invention is suitable for any shape.

EXAMPLES

Hereinafter, the invention will be described in further detail with reference to examples. However, within the gist thereof, the invention is not limited to the following examples.

[Measurement/Evaluation]

Separators and lithium ion secondary batteries produced in the following examples and comparative examples were subjected to the following measurements and evaluations.

(Mean and Standard Deviation of Thickness)

The thickness of a separator or a porous substrate was measured as follows. First, a separator or a porous substrate was cut to a size of 10 cm×10 cm, and ten sample pieces were prepared. The center of each sample piece in the width direction (TD) was measured for thickness at 10 points at intervals of 1 cm in the length direction (MD) to give thickness data at 100 points in total. Then, based on the thickness data at 100 points, the mean and standard deviation were calculated. For the measurement of thickness, a contact thickness meter (e.g., LITEMATIC manufactured by Mitutoyo Corporation) was used. A cylindrical terminal 5 mm in diameter was used as a measuring terminal, and it was adjusted to apply a load of 7 g during the measurement.

(Mean and Standard Deviation of Areal Weight)

Ten sample pieces having a size of 10 cm×10 cm cut out from a separator were prepared, and the mass of each sample piece was measured. The mass was divided by the area to determine the areal weight of each separator. Next, the adhesive porous layer (coating layer) provided on each sample piece was dissolved away by a solvent, and the mass of the porous substrate was measured. The mass was divided by the area to determine the areal weight of the porous substrate. Subsequently, the areal weight of the porous substrate was subtracted from the areal weight of the separator to determine the areal weight of the adhesive porous layer of each sample piece. Based on the areal weight data of the adhesive porous layer at 10 points, the mean and standard deviation of areal weight were calculated.

The ratio of the standard deviation of the areal weight of the adhesive porous layer to the mean of the areal weight of the adhesive porous layer (variations in areal weight) was obtained by dividing the standard deviation by mean of the areal weight (g/m$^2$) of the adhesive porous layer determined as above.

(Standard Deviation/Mean of Thickness of Porous Substrate)

The ratio of the standard deviation of the thickness of a porous substrate to the mean of the thickness of the porous substrate (variations in thickness) was calculated using the mean and standard deviation of the thickness (μm) of the porous substrate determined as above.

(Tensile Strength)

The tensile strength of a porous substrate or a separator was measured as follows. Using a tensile tester (RTC-1225A manufactured by A&D Company), a sample adjusted to 10 mm×100 mm was subjected to measurement under the following conditions: load cell load: 5 kgf, chuck-to-chuck distance: 50 mm, tensile rate: 100 mm/min. The stress at break was taken as tensile strength.

(Elongation)

The elongation of a porous substrate or a separator was measured as follows. Using a tensile tester (RTC-1225A manufactured by A&D Company), a sample adjusted to 10 mm×100 mm was subjected to measurement under the following conditions: load cell load: 5 kgf, chuck-to-chuck distance: 50 mm, tensile rate: 100 mm/min. The chuck-to-chuck distance at break was divided by the initial chuck-to-chuck distance of 50 mm, and the quotient was taken as elongation.

(Young's Modulus)

The Young's modulus of a porous substrate or a separator was measured as follows. Using a tensile tester (RTC-1225A manufactured by A&D Company), the Young's modulus of a sample adjusted to 10 mm×100 mm was measured with reference to JIS K 7161 under the following conditions: load cell load: 5 kgf, chuck-to-chuck distance: 50 mm, tensile rate: 100 mm/min.

(Puncture Resistance)

The puncture resistance of a porous substrate or a separator was measured as follows. A sample was inserted into a metal frame having a hole of ϕ11.3 mm (sample holder) together with a packing made of silicone rubber and fixed, and subjected to measurement using Handy Compression Tester KES-G5 (manufactured by Kato Tech Co., Ltd.). With respect to the measurement conditions, the needle tip curvature radius was 0.5 mm, and the puncture rate was 2 mm/sec. The maximum puncture load was taken as puncture resistance.

(Cycle Characteristics)

A test battery produced below was repeatedly charged and discharged at a charge voltage of 4.2 V and a discharge voltage of 2.75 V. The discharge capacity at the 100$^{th}$ cycle was divided by the initial capacity, and the average capacity retention and the range of fluctuation (%) through repeated charging and discharging were evaluated as cycle characteristics. The evaluation criteria were as follows.

A: Capacity retention is 85% or more, and the range of fluctuation is 7% or less B: Capacity retention is 85% or more, but the range of fluctuation is more than 7%

C: Capacity retention is less than 85%, and the range of fluctuation is more than 7%

(Adhesion to Electrodes)

A test battery was disassembled, and the magnitude of the force required to remove each of the negative electrode and the positive electrode from the separator was measured using a tensile tester (RTC-1225A manufactured by A&D Company). Taking the magnitude of the force in Example 1 as 100, adhesion was evaluated as an index. An index of 80 or more is a practically desired level.

(Slitting Properties)

A separator was transferred under the following conditions: transfer rate: 40 m/min, unrolling tension: 0.3 N/cm, rolling tension: 0.1 N/cm. During the horizontal transfer, a razor blade made of stainless steel was pressed against the separator at an angle of 60° to subject 1,000 m of the separator to a slitting treatment. The external appearance of the end face (slit end face) was visually observed, and the number of observable parts that had fallen off during the slitting process was counted.

<Evaluation Criteria>

A: The number of 0.5-mm or larger chips from an adhesive porous layer is 5 or less.

B: The number of 0.5-mm or larger chips from an adhesive porous layer is 10 or less.

C: The number of 0.5-mm or larger chips from an adhesive porous layer is 20 or less.

D: The number of 0.5-mm or larger chips from an adhesive porous layer is more than 20.

Example 1

Production of Separator

As an adhesive resin, a vinylidene fluoride/hexafluoropropylene copolymer (=98.9/1.1 [molar ratio], weight average molecular weight: 1,950,000) was used. In addition, a magnesium hydroxide having an average particle size of 0.8 μm was used as an inorganic filler, and the ratio of the inorganic filler to the polyvinylidene fluoride resin [mass ratio] was set to 0.01 (=inorganic filler/polyvinylidene fluoride resin).

The polyvinylidene fluoride resin and the magnesium hydroxide in the above ratio were dissolved to a concentration of 5 mass % in a mixed solvent of dimethylacetamide and tripropylene glycol (=7/3 [mass ratio]) to prepare a coating liquid.

As a porous substrate, a polyethylene microporous membrane (thickness: 9 μm, Gurley number: 160 sec/100 cc, porosity: 43%) was used.

Both sides of the polyethylene microporous membrane were coated with the same amount of the coating liquid obtained as above. Next, a coagulation liquid obtained by mixing water, dimethylacetamide, and tripropylene glycol (=57/30/13 [mass ratio]) was prepared, and the polyethylene microporous membrane was immersed in the coagulation liquid (40° C.) to solidify the adhesive resin.

It was then washed with water and dried to give a separator having an adhesive porous layer made of a polyvinylidene fluoride resin formed on both sides of a polyolefin microporous membrane.

With respect to this separator, Table 1 summarizes the physical properties of the porous substrate (the mean of thickness, the standard deviation/mean of thickness, elongation in the MD direction and the TD direction, puncture resistance, tensile strength in the MD direction and the TD direction, and Young's modulus), the physical properties of the adhesive porous layer (the weight average molecular weight (MW) of the adhesive resin, filler mass ratio (inorganic filler mass/polyvinylidene fluoride resin mass), the mean and the standard deviation/mean of the areal weight of the adhesive porous layer (total on both sides)), and the physical properties of the separator (elongation in the MD direction and the TD direction, puncture resistance, tensile strength in the MD direction and the TD direction, and Young's modulus). In addition, the following examples and comparative examples are also summarized in Table 1 similarly.

Production of Nonaqueous Electrolyte Battery (1) Production of Negative Electrode 300 g of artificial graphite as a negative electrode active material, 7.5 g of an aqueous dispersion containing 40 mass % a modified styrene-butadiene copolymer as a binder, 3 g of carboxymethyl cellulose as a thickener, and an appropriate amount of water were stirred in a double-arm mixer to prepare a slurry for a negative electrode. The slurry for a negative electrode was applied to a copper foil having a thickness of 10 μm as a negative electrode collector, dried, and then pressed to give a negative electrode having a negative electrode active material layer.

(2) Production of Positive Electrode 89.5 g of a lithium cobalt oxide powder as a positive electrode active material, 4.5 g of acetylene black as an electrically conductive auxiliary, and 6 g of polyvinylidene fluoride as a binder were dissolved in N-methyl-pyrrolidone (NMP) to a polyvinylidene fluoride concentration of 6 mass %, and stirred in a double-arm mixer to prepare a slurry for a positive electrode. The slurry for a positive electrode was applied to an aluminum foil having a thickness of 20 μm as a positive electrode collector, dried, and then pressed to give a positive electrode having a positive electrode active material layer.

(3) Production of Battery

A lead tab was welded to the positive electrode and the negative electrode. Then, the positive electrode, the separator, and the negative electrode were stacked in this order and joined together, impregnated with an electrolyte, and enclosed in an aluminum pack using a vacuum sealer. As the electrolyte, a 1 M $LiPF_6$ mixed solution obtained by mixing ethylene carbonate (EC) and ethylmethyl carbonate (DMC) in a mass ratio of 3:7 (=EC:DMC) was used.

Using a hot press, a load of 20 kg per $cm^2$ of electrode was applied to the aluminum pack having enclosed therein the electrolyte, and the aluminum pack was hot-pressed at 90° C. for 2 minutes to produce a test battery (lithium ion secondary battery).

Example 2

A separator was produced in the same manner as in Example 1, except that the ratio of the inorganic filler to the polyvinylidene fluoride resin [mass ratio] in Example 1 was changed to 0.03 (=inorganic filler/polyvinylidene fluoride resin) to adjust the "standard deviation of areal weight/mean of areal weight" of the adhesive porous layer made of a polyvinylidene fluoride resin to the value shown in Table 1 below. A test battery (lithium ion secondary battery) was then produced.

Example 3

A separator was produced in the same manner as in Example 1, except that the ratio of the inorganic filler to the polyvinylidene fluoride resin [mass ratio] in Example 1 was changed to 0.05 (=inorganic filler/polyvinylidene fluoride resin) to adjust the "standard deviation of areal weight/mean of areal weight" of the adhesive porous layer made of a polyvinylidene fluoride resin to the value shown in Table 1 below. A test battery (lithium ion secondary battery) was then produced.

Example 4

A separator was produced in the same manner as in Example 1, except that the porous substrate in Example 1 was replaced with a polyethylene microporous membrane having the physical property values shown in Table 1 below. A test battery (lithium ion secondary battery) was then produced.

Examples 5 and 6

Separators of Examples 5 and 6 were each produced in the same manner as in Example 1, except that the porous substrate in Example 1 was replaced with a polyethylene microporous membrane having the physical property values shown in Table 1 below, and the ratio of the inorganic filler to the polyvinylidene fluoride resin [mass ratio] was changed to 0.5 (=inorganic filler/polyvinylidene fluoride resin). Test batteries (lithium ion secondary batteries) were then produced.

Examples 7 and 8

Separators of Examples 7 and 8 were each produced in the same manner as in Example 1, except that the adhesive resin in Example 1 was replaced with a vinylidene fluoride/hexafluoropropylene copolymer having a weight average molecular weight of 600,000 or 3,000,000. Test batteries (lithium ion secondary batteries) were then produced.

Example 9

As a coating liquid, a coating liquid containing a styrene-butadiene copolymer and carboxymethyl cellulose (styrene-butadiene copolymer:carboxymethyl cellulose:water=3:2:95 [mass ratio]) was prepared. Both sides of the same polyethylene macroporous membrane as in Example 1 were coated with the same amount of the coating liquid, and dried to give a separator including an adhesive porous layer made of a styrene-butadiene copolymer. The areal weight of the adhesive porous layer in the obtained separator was 1.9 $g/m^2$, and the standard deviation/mean of areal weight was 0.19.

Comparative Example 1

A separator was produced in the same manner as in Example 1, except that the ratio of the inorganic filler to the polyvinylidene fluoride resin [mass ratio] in Example 1 was changed to 0.10 (=inorganic filler/polyvinylidene fluoride resin) to adjust the "standard deviation of areal weight/mean of areal weight" of the adhesive porous layer made of a polyvinylidene fluoride resin to the value shown in Table 1 below. A test battery (lithium ion secondary battery) was then produced.

Comparative Examples 2 to 5

Separators of Comparative Examples 2 to 5 were each produced in the same manner as in Example 1, except that the porous substrate in Example 1 was replaced with a polyethylene macroporous membrane having the physical property values shown in Table 1 below. Test batteries (lithium ion secondary batteries) were then produced.

As shown in Table 1, in the examples, because the "standard deviation of areal weight/mean of areal weight" of an adhesive porous layer is within the predetermined range, the results show excellent adhesion to electrodes, excellent cycle characteristics, and excellent slitting properties as compared with the comparative examples. Incidentally, the evaluation results of Example 9 were also at the same level as in Example 1.

What is claimed is:

1. A separator for a nonaqueous electrolyte battery, comprising a porous substrate and an adhesive porous layer that is provided on one side or both sides of the porous substrate and contains an adhesive resin, the ratio of the standard deviation of the areal weight of the adhesive porous layer to the mean of the areal weight of the adhesive porous layer (g/m$^2$) (standard deviation/mean) being 0.25 or less,

TABLE 1

| | Porous Substrate | | | | | | Adhesive Porous Layer | | | | |
|---|---|---|---|---|---|---|---|---|---|---|---|
| | Thickness [μm] | Standard Deviation/ Mean of Thickness | Elongation [%] MD/TD | Puncture Resistance [g] | Tensile Strength [N/cm] MD/TD | Young's Modulus [GPa] MD/TD | Adhesive Resin Kind | Adhesive Resin Mw | Filler Mass Ratio | Areal Weight [g/m$^2$] | Standard Deviation/ Mean of Areal Weight |
| Example 1 | 9 | 0.01 | 82/113 | 411 | 20/14 | 2.4/1.3 | PVDF | 1,950,000 | 0.01 | 2.3 | 0.13 |
| Example 2 | 9 | 0.01 | 82/113 | 411 | 20/14 | 2.4/1.3 | PVDF | 1,950,000 | 0.03 | 2.4 | 0.28 |
| Example 3 | 9 | 0.01 | 82/113 | 411 | 20/14 | 2.4/1.3 | PVDF | 1,950,000 | 0.05 | 2.4 | 0.20 |
| Example 4 | 9 | 0.03 | 81/110 | 405 | 21/14 | 2.4/1.3 | PVDF | 1,950,000 | 0.01 | 2.3 | 0.25 |
| Example 5 | 9 | 0.02 | 100/150 | 420 | 22/16 | 2.3/1.2 | PVDF | 1,950,000 | 0.5 | 2.5 | 0.30 |
| Example 6 | 9 | 0.02 | 150/115 | 380 | 19/13 | 2.0/1.0 | PVDF | 1,950,000 | 0.5 | 2.4 | 0.29 |
| Example 7 | 9 | 0.01 | 82/113 | 411 | 20/14 | 2.4/1.3 | PVDF | 600,000 | 0.01 | 2.3 | 0.28 |
| Example 8 | 9 | 0.01 | 82/113 | 411 | 20/14 | 2.4/1.3 | PVDF | 3,000,000 | 0.01 | 2.3 | 0.29 |
| Comparative Example 1 | 9 | 0.01 | 82/113 | 411 | 20/14 | 2.4/1.3 | PVDF | 1,950,000 | 0.10 | 2.4 | 0.40 |
| Comparative Example 2 | 12 | 0.05 | 210/250 | 305 | 19/15 | 1.1/0.7 | PVDF | 1,950,000 | 0.01 | 2.3 | 0.39 |
| Comparative Example 3 | 9 | 0.03 | 45/120 | 320 | 22/10 | 3.1/0.9 | PVDF | 1,950,000 | 0.01 | 2.3 | 0.35 |
| Comparative Example 4 | 30 | 0.04 | 70/100 | 850 | 60/44 | 2.2/1.2 | PVDF | 1,950,000 | 0.01 | 2.3 | 0.41 |
| Comparative Example 5 | 12 | 0.03 | 110/6 | 190 | 26/2 | 3.0/0.5 | PVDF | 1,950,000 | 0.01 | 2.3 | 0.33 |

| | Separator | | | | Evaluation | | |
|---|---|---|---|---|---|---|---|
| | Elongation [%] MD/TD | Puncture Resistance [g] | Tensile Strength [N/cm] MD/TD | Young's Modulus [GPa] MD/TD | Adhesion to Electrodes | Cycle Characteristics | Slitting Properties |
| Example 1 | 81/112 | 421 | 21/15 | 1.8/0.9 | 100 | A | A |
| Example 2 | 83/115 | 428 | 20/13 | 1.8/0.9 | 83 | A | B |
| Example 3 | 84/115 | 425 | 22/15 | 1.9/0.9 | 98 | A | A |
| Example 4 | 80/110 | 415 | 21/14 | 1.8/0.9 | 93 | A | A |
| Example 5 | 115/140 | 430 | 23/17 | 1.8/0.9 | 79 | A | B |
| Example 6 | 157/125 | 390 | 20/14 | 1.7/0.7 | 79 | A | B |
| Example 7 | 81/112 | 418 | 21/15 | 1.8/0.9 | 81 | A | B |
| Example 8 | 81/112 | 425 | 21/15 | 1.8/0.9 | 80 | A | B |
| Comparative Example 1 | 79/105 | 424 | 24/15 | 1.9/1.0 | 75 | C | C |
| Comparative Example 2 | 210/250 | 318 | 20/16 | 0.9/0.5 | 75 | C | C |
| Comparative Example 3 | 44/130 | 331 | 23/11 | 2.4/0.7 | 76 | B | B |
| Comparative Example 4 | 65/95 | 880 | 61/45 | 2.0/1.0 | 74 | C | B |
| Comparative Example 5 | 105/5 | 195 | 27/2 | 2.8/0.3 | 76 | B | B |

wherein the porous substrate has a mean thickness in a range of 5 μm to 9 μm, and the ratio of the standard deviation of the thickness of the porous substrate to the mean of the thickness of the porous substrate (μm) (standard deviation/mean) is 0.02 or less.

2. The separator for a nonaqueous electrolyte battery according to claim 1, wherein the adhesive resin is a polyvinylidene fluoride resin.

3. The separator for a nonaqueous electrolyte battery according to claim 2, wherein the polyvinylidene fluoride resin has a weight average molecular weight of 600,000 or more and 3,000,000 or less.

4. The separator for a nonaqueous electrolyte battery according to claim 1, wherein the porous substrate has an elongation of 50% or more and 200% or less in the MD direction or the TD direction.

5. The separator for a nonaqueous electrolyte battery according to claim 1, wherein the porous substrate has a puncture resistance of 200 g or more and 800 g or less.

6. The separator for a nonaqueous electrolyte battery according to claim 1, wherein the adhesive porous layer contains a filler, and the mass ratio of the filler to the adhesive resin (filler mass/adhesive resin mass) is 0.01 or more and 0.05 or less.

7. A nonaqueous electrolyte battery comprising a positive electrode, a negative electrode, and the separator for a nonaqueous electrolyte battery of claim 1 disposed between the positive electrode and the negative electrode, an electromotive force thereof being obtained by lithium doping/dedoping.

8. A separator for a nonaqueous electrolyte battery, comprising a porous substrate and an adhesive porous layer that is provided on one side or both sides of the porous substrate and contains an adhesive resin, the ratio of the standard deviation of the areal weight of the adhesive porous layer to the mean of the areal weight of the adhesive porous layer (g/m$^2$) (standard deviation/mean) being 0.25 or less, wherein the porous substrate has a mean thickness in a range of 5 μm to 9 μm, and the adhesive resin is a polyvinylidene fluoride resin that has a weight average molecular weight of 600,000 or more and 3,000,000 or less.

9. The separator for a nonaqueous electrolyte battery according to claim 8, wherein the ratio of the standard deviation of the thickness of the porous substrate to the mean of the thickness of the porous substrate (μm) (standard deviation/mean) is 0.01 or less.

10. The separator for a nonaqueous electrolyte battery according to claim 8, wherein the porous substrate has an elongation of 50% or more and 200% or less in the MD direction or the TD direction.

11. The separator for a nonaqueous electrolyte battery according to claim 8, wherein the porous substrate has a puncture resistance of 200 g or more and 800 g or less.

12. The separator for a nonaqueous electrolyte battery according to claim 8, wherein the adhesive porous layer contains a filler, and the mass ratio of the filler to the adhesive resin (filler mass/adhesive resin mass) is 0.01 or more and 0.05 or less.

13. A nonaqueous electrolyte battery comprising a positive electrode, a negative electrode, and the separator for a nonaqueous electrolyte battery of claim 8 disposed between the positive electrode and the negative electrode, an electromotive force thereof being obtained by lithium doping/dedoping.

* * * * *